No. 635,324. Patented Oct. 24, 1899.
R. KILBURN.
TAP FOR FORMING SCREW THREADS.
(Application filed Feb. 1, 1898.)
(No Model.) 3 Sheets—Sheet 1.
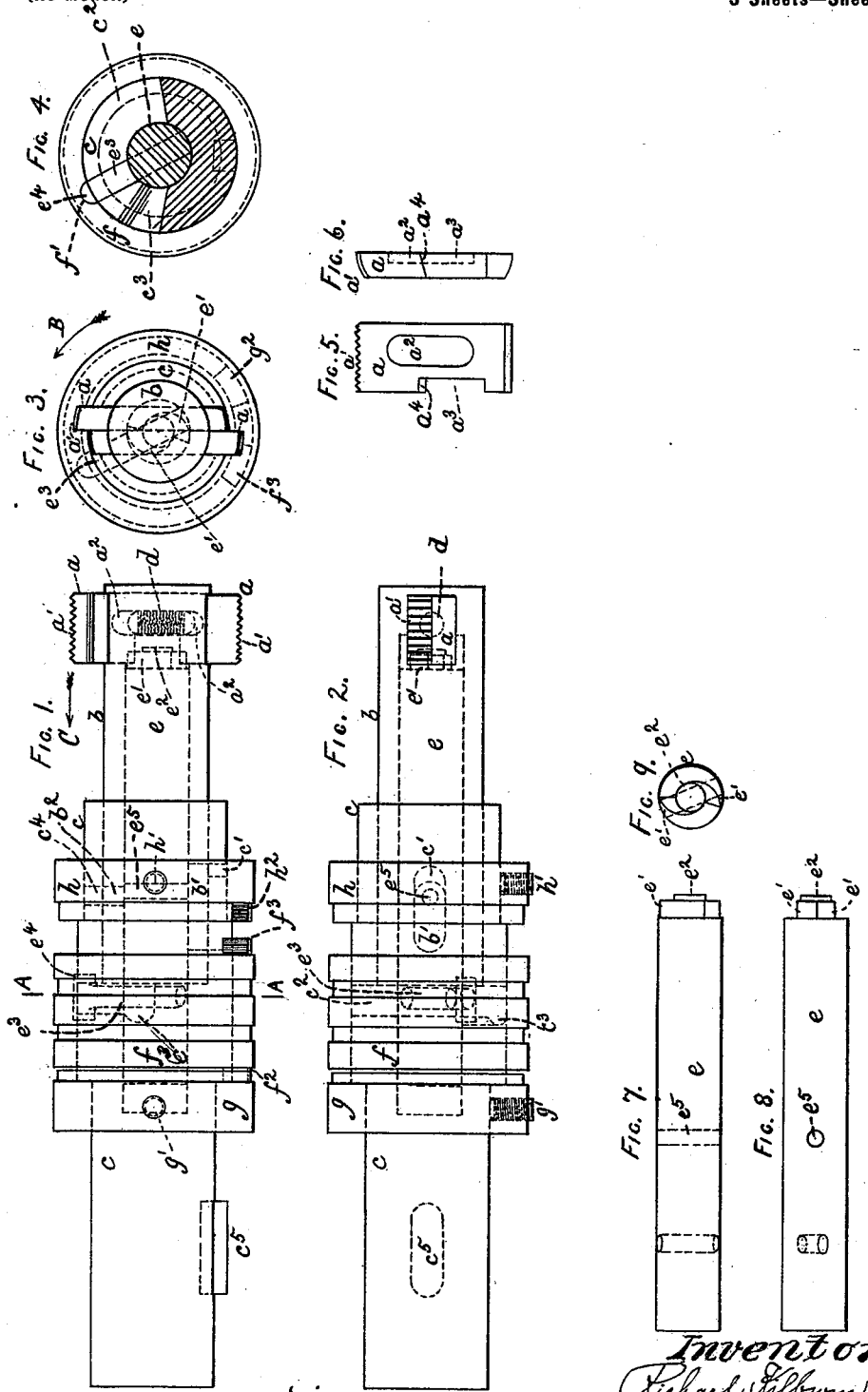

No. 635,324. Patented Oct. 24, 1899.
R. KILBURN.
TAP FOR FORMING SCREW THREADS.
(Application filed Feb. 1, 1898.)
(No Model.) 3 Sheets—Sheet 2.
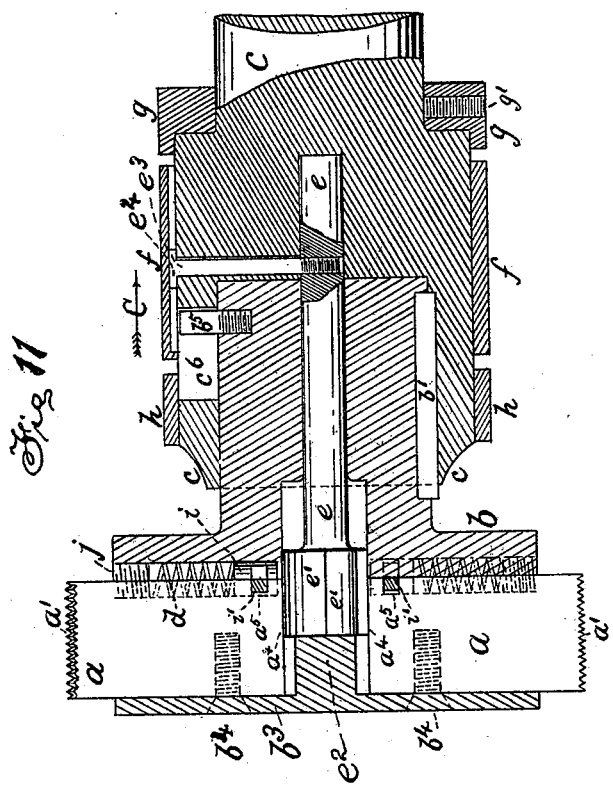
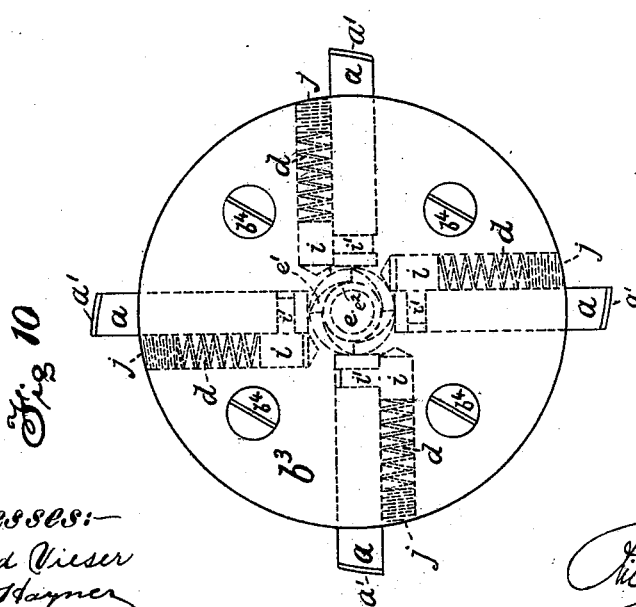
Witnesses:
Edward Vieser
Fred Hayner
Inventor
Richard Kilburn
by attorneys
Brown & Seward No. 635,324. Patented Oct. 24, 1899.
R. KILBURN.
TAP FOR FORMING SCREW THREADS.
(Application filed Feb. 1, 1898.)
(No Model.) 3 Sheets—Sheet 3.
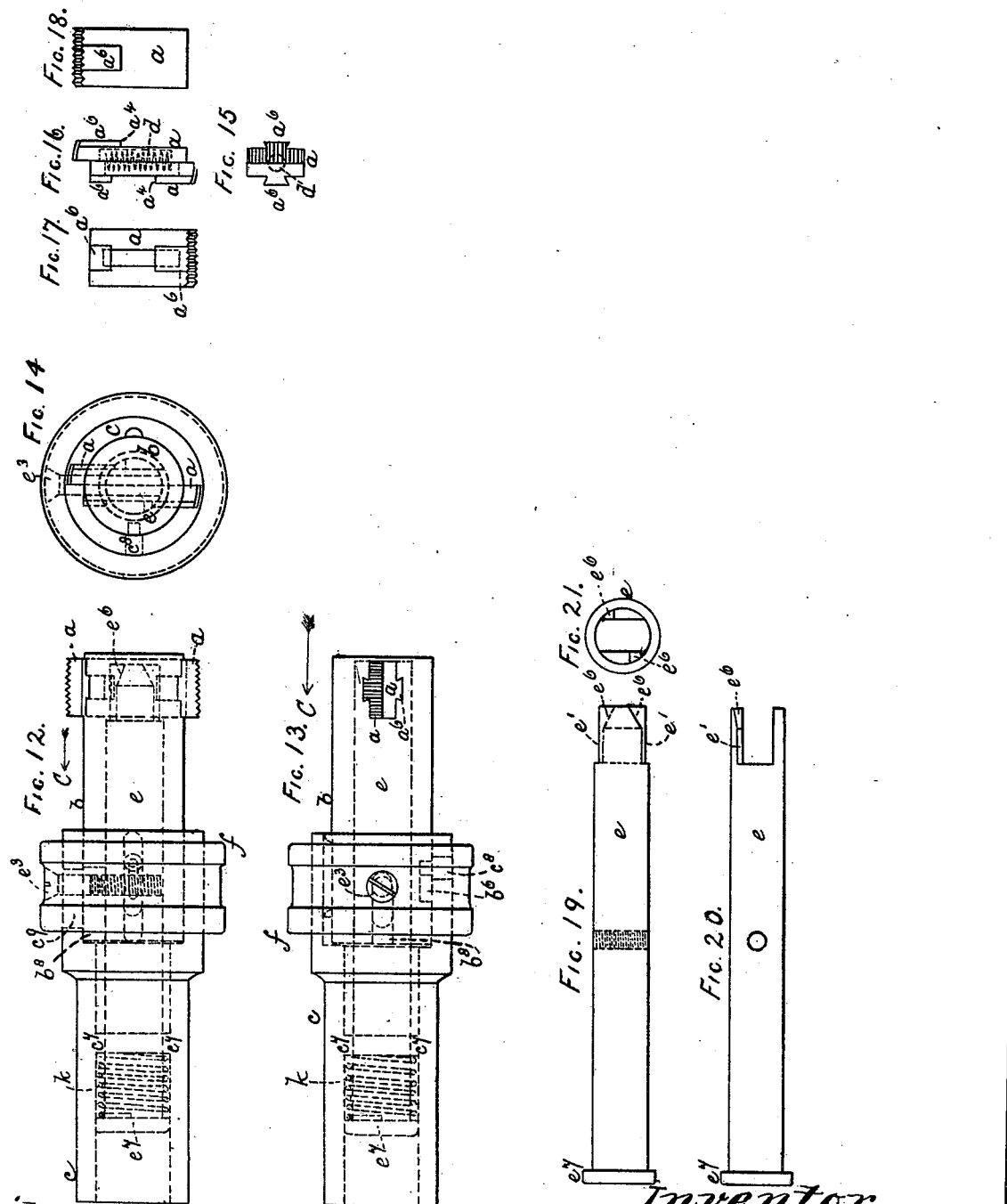
Witnesses:—
Inventor:
Richard Kilburn

UNITED STATES PATENT OFFICE.

RICHARD KILBURN, OF MANCHESTER, ENGLAND.

TAP FOR FORMING SCREW-THREADS.

SPECIFICATION forming part of Letters Patent No. 635,324, dated October 24, 1899.

Application filed February 1, 1898. Serial No. 668,731. (No model.)

*To all whom it may concern:*

Be it known that I, RICHARD KILBURN, a subject of the Queen of the United Kingdom of Great Britain and Ireland, and a resident of 138 Church Lane, Gorton, Manchester, in the county of Lancaster, England, have invented a new and useful Improvement in Taps for Forming Screw-Threads, of which the following is a specification.

My invention consists in improvements in taps for use in forming screw-threads in articles or objects being operated upon in lathes or screwing-machines or other machines; and the principal object of my invention is the provision of taps which can be released and withdrawn from the screw-threads formed by means of them without being unscrewed from such screw-threads and shall be efficient and convenient in use, simple in construction, and cheap to maintain in working condition and shall not need any adjustment to be made in them to enable them to form screw-threads in holes of different depths.

In the accompanying drawings, throughout all the views of which the same letters of reference are employed to indicate corresponding parts, Figure 1 is a side elevation, Fig. 2 is a plan, and Fig. 3 is an end elevation, of one form of tap constructed according to my invention. Fig. 4 is a transverse section through such tap, taken on the plane indicated by the line A A of Fig. 1, but with a pin or key which appears in it shown in elevation. Figs. 5 and 6 are side elevations at right angles to each other of one of the dies or cutters of the tap illustrated by Figs. 1, 2, and 3. Fig. 7 is a side elevation, Fig. 8 a plan, and Fig. 9 an end elevation, of a rod whereby the dies or cutters of the tap illustrated by Figs. 1, 2, and 3 are adjusted into and held in working position. Fig. 10 is a front elevation of a tap similar to that illustrated in Figs. 1, 2, and 3, but with four dies or cutters instead of two, and adapted for forming screw-threads of larger diameter. Fig. 11 is a longitudinal section of the tap illustrated in Fig. 10, but with the dies, central rod, and two pins or keys shown unsectioned. Fig. 12 is a side elevation, Fig. 13 a plan, and Fig. 14 an end elevation, of a tap of a somewhat simpler construction than that shown in Figs. 1, 2, and 3. Fig. 15 is a plan, and Fig. 16 an elevation, showing one longitudinal edge of each of the dies or cutters of the tap illustrated in Figs. 12, 13, and 14. Figs. 17 and 18 are elevations of the surfaces of the two dies or cutters which are directed away from their plane of contact. Fig. 19 is a side elevation, Fig. 20 a plan, and Fig. 21 an end elevation, of a rod whereby the dies or cutters of the tap illustrated by Figs. 12, 13, and 14 are adjusted into and held in operative position.

In the tap illustrated in Figs. 1, 2, and 3, $a\ a$ are two dies or cutters. $b$ is a holder in which the dies or cutters are capable of being slid to and fro, and $c$ is a socket in which the holder $b$ is mounted so that it may slide lengthwise. Each die or cutter $a$ is formed at its end $a'$ with cutting-teeth adapted to form screw-threads of the character required and is arranged to fit and slide lengthwise in slots formed at opposite sides of the holder $b$ and is formed with a cavity $a^2$, against one end of which bears a spring $d$, which, being placed between the two dies or cutters so as to be half in each, tends to move them and bring their ends $a'$ toward each other and when the tap is in use serves to withdraw the dies or cutters $a$ from the screw-threads which they have formed.

In each die or cutter $a$ is a notch $a^3$, into which projects the end of a rod $e$, placed in the socket $c$ and having placed upon it the holder $b$. Two holding-faces or cams $e'$ upon the rod $e$ have the notches $a^3$ of the dies or cutters $a$ placed upon them, so that by the rod $e$ being turned in the direction indicated by the arrow B the distance between the cutting parts $a'$ of the dies or cutters $a$ may be increased. The rod $e$ is also formed with a projection $e^2$ of a radius equal to the distance from its axis to the smallest part of each of the cam-faces $e'$, which serves to prevent the cutting parts $a'$ from being brought too close together by the spring $d$ and to prevent the dies or cutters $a$ from being accidentally removed from the holder $b$. Through a keyway or slot $c'$ in the socket $c$ a key $b'$ is inserted into and fixed in a slot formed in the holder $b$. The key $b'$ is of the same width as but somewhat shorter than the keyway $c'$, into which it projects, and so, besides preventing the holder $b$ from being turned in the socket $c$, permits it to be moved lengthwise therein sufficiently to enable the notches $a^3$ of the dies or cutters $a$ to be placed upon or withdrawn from the holding-faces or cams $e'$, but not from the projection $e^2$. To allow the rod $e$ to be turned, but to prevent it from being moved lengthwise in the socket $c$ during the ordinary use of the tap and allow it to be moved lengthwise when necessary to release the dies or cutters $a$, a pin or key $e^3$ is fixed in such rod and made to project through a slot $c^2$, formed partially around the socket $c$ and serving to limit the extent to which the pin or key $e^3$ may be turned, and a head $e^4$ upon such pin or key $e^3$ is made to engage with a groove $f'$, formed lengthwise of the interior of a ring or collar $f$, capable of being turned upon and moved lengthwise of the socket $c$ and formed with projections $f^2 f^3$ to be placed, respectively, in engagement with notches $g^2$ $h^2$, respectively formed in rings $g$ $h$, secured by means of set-screws $g'$ $h'$ in position upon the socket $c$, so that by the ring being turned and then moved lengthwise in order to bring one or other of its projections into engagement with one or other of the rings $g$ $h$ the cams $e'$ may be made to move the dies or cutters $a$ into and hold them in the positions requisite for forming screw-threads, as required. The slot $c^2$ has near one end an enlargement $c^3$, so that by the pin or key $e^3$ being turned opposite to and made to pass into such enlargement the projection $e^2$ of the rod $e$ may be withdrawn from the cutters or dies $a$, so as to release them to be sharpened or recut or replaced by others. Holes $c^4$, $b^2$, and $e^5$ are formed in the socket $c$, holder $b$, and rod $e$, respectively, in such positions that when the pin or key $e^3$ is brought into the enlargement $c^3$ of the slot $c^2$ all such holes shall have their center lines in one straight line, so that a drift or pin may be passed through them to enable the key $b'$ to be driven out of the holder $b$ and socket $c$ whenever the socket $c$, holder $b$, and rod $e$ are to be taken apart. The rings or collars $f$ $g$ $h$ are preferably provided externally with milled ribs, so as to be more readily turned, and the socket $c$ is provided with a key $c^5$ in order that it may be more readily held in any lathe, screwing-machine, or other machine in which it is to be employed.

Obviously the two holding-faces or cams $e'$ of the rod $e$ must be alike and have their corresponding parts at equal distances from the axis of such rod and that the dies or cutters $a$ must be equal in length from the cutting parts $a'$ to the parts $a^4$, whereby they bear on the cams $e'$, so that the cutting parts $a'$ shall be equidistant from the axis of the tap in every position of the rod $e$ while in engagement therewith.

In preparing the tap illustrated in Figs. 1, 2, and 3 for use the rod $e$ is turned so that the smallest part of each cam or holding-face $e'$ is brought into line with the part $a^4$ of the die or cutter $a$ with which it is used and the holder $b$ is moved in the direction indicated by the arrow C in the socket $c$, so that the said parts $a^4$ are brought into engagement with the cams or holding-faces $e'$, and then the rod $e$ is turned into position to separate the parts $a'$ to the extent requisite and held in such position by the collar $f$ being engaged with the collar $g$ or the collar $h$, which is secured in suitable position. The provision of the two collars $g$ $h$ enables the rod $e$ to be secured in either of two required positions whenever it may be desirable to form successively screw-threads of somewhat different diameters or to form screw-threads by means of two successive cuts or operations.

When the dies or cutters $a$ have been set in the manner hereinbefore described in position to form screw-threads of the diameter required and are in operation in the threading of a hole, the threading operation will continue until the operation of the usual stop of the turret-lathe or machine provided for the purpose prevents the socket $c$ from being moved with the dies $a$ and the holder $b$ toward the object operated upon. Thereupon the dies $a$, screwing themselves into said object, will disengage themselves from the holding-faces or cams $e'$ and be disengaged by the spring $d$ from the screw-thread which they have formed, so that the tap may be withdrawn without being unscrewed. Then the ring or collar $f$, being turned by an attendant in the direction opposite to that indicated by the arrow B, so as to bring the smallest parts of the holding-faces or cams $e'$ into line with the parts $a^4$ of the dies or cutters $a$, the holder $b$ is moved by the attendant in the socket $c$ in the direction indicated by the arrow C, so that the dies or cutters $a$ are again engaged with the cams or holding-faces $e'$ and the ring or collar $f$ is turned in the direction indicated by the arrow B to set the dies or cutters $a$ in position to form a screw-thread in another article or object or to perform a second cut in an already partially-screw-threaded object.

The tap illustrated by Figs. 10 and 11, which is adapted to form screw-threads of larger diameters, is provided with four dies or cutters $a$, mounted in grooves in a holder $b$ and each having teeth $a'$ and a face $a^4$ to bear against the corresponding cam-faces $e'$ of the rod $e$, of which there are four. Four springs $d$ are provided to move the four dies or cutters $a$ toward the axis of the tap, and each spring is placed in one of four holes formed in the holder $b$ and each in communication at one side with the groove holding the dies or cutters and is made to bear against the holder $b$ and against a block $i$, placed in the same hole and provided with a projection $i'$, engaging a notch in the die or cutter $a$ with which it is used and so enabling the said spring to move such die or cutter $a$. A cover-plate $b^3$, secured by screws $b^4$, serves to hold the four dies or cutters $a$ in the holder $b$ and is provided with a central projection $e^2$, answering the same purpose as the projection $e^2$ hereinbefore described. Obviously the projection $e^2$ could be formed upon the rod $e$ instead of upon the cover-plate $b^3$. The movement of the holder $b$ in the socket $c$ is limited by means of a pin $b^5$ and slot $c^6$. The cover-plate $b^3$ being removable enables the dies or cutters $a$ and rod $e$ to be removed from the tap at any time without disturbance of the key $b'$. Except in so far as has been hereinbefore described the tap illustrated in Figs. 10 and 11. is similar to the tap illustrated in Figs. 1, 2, and 3.

In cases in which it is not necessary to provide for the adjustment of the dies or cutters my invention may be applied in the manner illustrated by the tap shown in Figs. 12, 13, and 14, in which the dies or cutters $a$ are mounted in slots in a holder $b$ and provided with dovetailed ribs $a^6$, engaging with corresponding grooves in the holder $b$ and having shoulders $a^4$ to act in conjunction with a rod $e$, incapable of being turned in the socket $c$, in which it and the holder $b$ are mounted. The rod $e$ is provided with projections to embrace the dies or cutters $a$ and with faces $e'$, parallel to its length, and with inclined faces $e^6$, the faces $e'$ serving when engaged with the dies or cutters to hold them in position to form screw-threads and the inclined faces $e^6$ enabling the dies or cutters $a$ when displaced by their movement in the direction opposite to that indicated by the arrow C relative to the rod $e$ to move said rod in the opposite direction in being withdrawn from the screw-threads which they have formed. A spring $k$, bearing at one end against a collar $e^7$ on the rod $e$ and at the other end against a collar $c^7$ in the interior of the socket $c$, is provided to assist the spring $d$ and dies or cutters $a$ in moving the rod $e$ in the direction indicated by the arrow C. In order that the dies or cutters $a$ may be inserted in the notch in the end of the rod $e$, one of them is provided with a dovetailed rib $a^6$ at one end only, so that it may be placed in the said notch when the other has already been placed therein. The movement of the holder $b$ in the socket $c$ is so limited by means of a groove $b^6$ in said holder and a stud $c^3$, screwed in the socket $c$, that the dies or cutters $a$ in being moved in the direction opposite to that indicated by the arrow C can only just be taken out of contact with the faces $e'$ and into contact with the inclined faces $e^6$, and the movement of the rod $e$ in the socket $c$ is so limited by means of a slot $c^9$ in the socket $c$ and a pin $e^3$, which passes through the ring or collar $f$ and is screwed into the rod $e$ to connect them and which also passes through the slot $c^9$ and through a slot $b^8$ in the holder $b$, that the rod $e$ cannot be moved so far in the direction indicated by the arrow C as to pass out of engagement with the dies or cutters $a$. In the use of the tap illustrated in Figs. 12, 13, and 14 as soon as the relative movement of the socket $c$ and the object operated upon is arrested the dies or cutters $a$ disengage themselves from the faces $e'$ and then being acted upon by the spring $d$ force the rod $e$ in the direction indicated by the arrow C by means of the inclined faces $e^6$, so that they may be disengaged by the spring $d$ from the screw-threads which they have formed. In order to restore the dies or cutters $a$ to position to form screw-threads, the rod $e$ and holder $b$ are moved in opposite directions lengthwise of the tap. When holding the dies or cutters $a$ in position to form screw-threads, the rod $e$ is held by them against being moved by the spring $k$.

Except in so far as has been hereinbefore described the tap illustrated in Figs. 12, 13, and 14 is similar to those illustrated in Figs. 1, 2, 3, 10 and 11.

What I claim as my invention is—

1. A tap for forming screw-threads comprising thread-cutting dies or cutters, capable of sliding endwise in a holder and having bearing-faces to act in conjunction with holding-faces upon a rod, a holder to receive such dies or cutters and be moved endwise thereby in one direction and also movable endwise in the opposite direction, a socket to receive such holder and permit it to be moved endwise, means for limiting the movement of said holder in said socket, means for disengaging said dies or cutters from screw-threads formed thereby, a rod in said socket and holder and furnished with faces to act upon the dies or cutters to move them into and hold them in working position and means for moving such rod, substantially as herein described.

2. A tap for forming screw-threads comprising thread-cutting dies or cutters each capable of sliding endwise in a holder and having a bearing-face to act in conjunction with a holding-face upon a rod, a holder to receive such dies or cutters and be moved endwise thereby in one direction and also movable endwise in the opposite direction, a socket to receive such holder and permit it to be moved endwise, means for limiting the movement of said holder in said socket, a spring for moving each die or cutter in said holder and disengaging it from screw-threads which it has cut, a rod in said socket or holder and furnished with faces to act upon the dies or cutters and move them into and hold them in working position and means for moving such rod, substantially as herein described.

3. A tap for forming screw-threads comprising thread-cutting dies or cutters each capable of sliding endwise in a holder and having a bearing-face to act in conjunction with a holding-face upon a rod, a holder to receive such dies and be moved endwise thereby in one direction and also movable endwise in the opposite direction, a socket to receive such holder and permit it to be moved endwise, means for limiting the movement of said holder in said socket, a spring to move each die or cutter in said holder and disengage it from screw-threads which it has cut, a rod in said socket and holder and furnished with cam-shaped faces to act upon the dies or cutters and move them into and hold them in working position and means for moving such rod, substantially as herein described.

4. A tap for forming screw-threads, comprising thread-cutting dies or cutters, each capable of sliding endwise in a holder and having a bearing-face to act in conjunction with a holding-face upon a rod, a holder to receive such dies and be moved endwise thereby in one direction and also movable endwise in the opposite direction, a socket to receive such holder and permit it to be moved endwise, means for limiting the movement of said holder in said socket, a spring for moving each die or cutter in said holder and disengaging it from screw-threads which it has cut, a rod arranged to be turned in said socket and holder and furnished with cam-shaped faces to act upon the dies or cutters and move them into and hold them in working position and enable them to be adjusted in position and means for turning such rod.

5. A tap for forming screw-threads comprising thread-cutting dies or cutters, each capable of sliding endwise in a holder and having a bearing-face to act in conjunction with a holding-face upon a rod, a holder to receive such dies or cutters and be moved endwise thereby in one direction and also movable endwise in the opposite direction, a socket to receive such holder and permit it to be moved endwise, means for limiting the endwise movement of said holder in said socket, a spring for moving each die or cutter in said holder and disengaging it from the screw-threads which it has cut, a rod arranged to be turned in said socket and holder and furnished with cam-shaped faces to act upon the dies or cutters and move them into and hold them in working position, means for turning such rod and collars with parts adapted to engage each other and retain said rod in the required positions after being turned into such positions, substantially as herein described.

6. A tap for forming screw-threads comprising thread-cutting dies or cutters each capable of sliding endwise in a holder and having a bearing-face to act in conjunction with a holding-face upon a rod, a holder to receive such dies or cutters and be moved endwise thereby in one direction and also movable endwise in the opposite direction, a socket to receive such holder and permit it to be moved endwise, means for limiting the endwise movement of said holder in said socket, a spring between such dies or cutters to move them in said holder and disengage them from the screw-threads which they have cut, a rod in said socket and holder and furnished with faces to act upon the dies or cutters and move them into and hold them in working position, and means for moving such rod, substantially as herein described.

7. A tap for forming screw-threads, comprising thread-cutting dies or cutters each capable of being slid endwise in a holder and having a bearing-face to act in conjunction with a holding-face upon a rod, a holder to receive such dies or cutters and be moved endwise thereby in one direction and also movable endwise in the opposite direction, a socket to receive such holder and permit it to be moved endwise, means for limiting the endwise movement of said holder in said socket, a spring between such dies or cutters for moving them in said holder and disengaging them from the screw-threads which they have cut, a rod in said socket and holder and furnished with cam-shaped faces to act upon the dies or cutters and move them into and hold them in working position, and means for moving such rod, substantially as herein described.

8. A tap for forming screw-threads, comprising thread-cutting dies or cutters each capable of being slid endwise in a holder and having a bearing-face to act in conjunction with a holding-face upon a rod, a holder to receive such dies or cutters and be moved endwise thereby in one direction and also movable endwise in the opposite direction, a socket to receive such holder and permit it to be moved endwise, means for limiting the endwise movement of said holder in said socket, a spring between such dies or cutters for moving them in said holder and disengaging them from the screw-threads which they have cut, a rod arranged to be turned in said socket and holder and furnished with cam-shaped faces to act upon the dies or cutters for moving them into and holding them in working position and means for turning said rod, substantially as herein described.

9. A tap for forming screw-threads comprising thread-cutting dies or cutters each capable of sliding endwise in a holder and having a bearing-face to act in conjunction with a holding-face upon a rod, a holder to receive such dies or cutters and be moved endwise thereby in one direction and also movable endwise in the opposite direction, a socket to receive said holder and permit it to be moved endwise, means for limiting the endwise movement of said holder in said socket, a spring placed between such dies or cutters for moving them in said holder and disengaging them from the screw-threads which they have cut, a rod arranged to be turned in said socket and holder and furnished with cam-shaped faces to act upon the dies or cutters and move them into and hold them in working position, means for turning such rod, and collars with parts adapted to engage each other for retaining the said rod in the required positions to which it has been turned, substantially as herein described.

10. In a tap for forming screw-threads, the combination with thread-cutting dies or cutters each capable of being slid endwise in a holder and having a bearing-face to act in conjunction with a holding-face upon a rod, of a holder to receive such dies or cutters and be moved endwise thereby in one direction and also movable endwise in the opposite direction, a socket to receive such holder and permit it to be moved endwise, means for limiting the endwise movement of said holder in said socket, a rod in said socket and holder and furnished with faces to act upon the dies or cutters and move them into and hold them in working position and means for moving such rod, substantially as herein described.

11. In a tap for forming screw-threads, the combination with thread-cutting dies or cutters each capable of sliding endwise in a holder and having a bearing-face to act in conjunction with a holding-face upon a rod, of a holder to receive such dies or cutters and be moved endwise thereby in one direction and also movable endwise in the opposite direction, a socket to receive such holder and permit it to be moved endwise, means for limiting the endwise movement of said holder in said socket, a rod in said socket and holder and furnished with cam-shaped faces to act upon the dies or cutters and move them into and hold them in working position and means for moving such rod, substantially as herein described.

12. In a tap for forming screw-threads, the combination with thread-cutting dies or cutters each capable of being slid lengthwise in a holder and having a bearing-face to act in conjunction with a holding-face upon a rod, of a holder to receive such dies or cutters and be moved endwise thereby in one direction and also movable endwise in the opposite direction, a socket to receive such holder and permit it to be moved endwise, means for limiting the endwise movement of said holder in said socket, a rod arranged to be turned in said socket and holder and furnished with cam-shaped faces to act upon the dies or cutters for moving and adjusting them into and holding them in working position and means for turning such rod, substantially as herein described.

13. In a tap for forming screw-threads, the combination with thread-cutting dies or cutters each capable of sliding endwise in a holder and having a bearing-face to act in conjunction with a holding-face upon a rod, of a holder to receive such dies or cutters and be moved endwise thereby in one direction and also movable in the opposite direction, a socket to receive said holder and permit it to be moved endwise, means for limiting the endwise movement of said holder in said socket, a rod arranged to be turned in said socket and holder and furnished with cam-shaped faces to act upon the dies or cutters for moving them into and holding them in working position, means for turning such rod and collars with parts adapted to engage each other and retain said rod in the required position to which it has been turned, substantially as herein described.

In testimony that I claim the foregoing as my invention I have signed my name, in presence of two witnesses, this 22d day of January, 1898.

RICHARD KILBURN.

Witnesses:
ARTHUR C. HALL,
HOWARD CHEETHAM.